United States Patent
Eline et al.

(10) Patent No.: US 9,797,728 B2
(45) Date of Patent: Oct. 24, 2017

(54) DRONE PROVIDED WITH A VERTICAL-VIEW VIDEO CAMERA COMPENSATED FOR THE INSTANTANEOUS ROTATIONS FOR ESTIMATION OF THE HORIZONTAL SPEEDS

(71) Applicant: PARROT DRONES, Paris (FR)

(72) Inventors: Pierre Eline, Arnouville les Gonesse (FR); Francois Callou, Paris (FR)

(73) Assignee: PARROT DRONES, Paris (FR)

( * ) Notice: Subject to any disclaimer, the term of this patent is extended or adjusted under 35 U.S.C. 154(b) by 8 days.

(21) Appl. No.: 15/087,883

(22) Filed: Mar. 31, 2016

(65) Prior Publication Data

US 2016/0290809 A1  Oct. 6, 2016

(30) Foreign Application Priority Data

Apr. 1, 2015 (FR) ...................................... 15 52813

(51) Int. Cl.
| | |
|---|---|
| *G06K 9/00* | (2006.01) |
| *G01C 21/16* | (2006.01) |
| *B64C 39/02* | (2006.01) |
| *G06T 7/20* | (2017.01) |

(52) U.S. Cl.
CPC .......... *G01C 21/165* (2013.01); *B64C 39/024* (2013.01); *G06T 7/20* (2013.01); *B64C 2201/127* (2013.01); *G06T 2207/10016* (2013.01)

(58) Field of Classification Search
None
See application file for complete search history.

(56) References Cited

U.S. PATENT DOCUMENTS

2011/0311099 A1\* 12/2011 Derbanne ............... G06T 7/207
382/103

FOREIGN PATENT DOCUMENTS

EP    2 400 460 A1    12/2011

OTHER PUBLICATIONS

Myung Hwangbo: "Robust Monocular Vision-based Navigation for a Miniature Fixed-Wing Aircraft", Sep. 15, 2009, XP055021926, //www.cs.smu.edu/myung/thesis_proposal.pdf//.

\* cited by examiner

*Primary Examiner* — Delomia L Gilliard
(74) *Attorney, Agent, or Firm* — Haverstock & Owens LLP

(57) ABSTRACT

A vertical-view camera (16) delivers an image signal ($S_{camV}$) of the ground overflown by the drone. Gyrometric sensors (102) measure the Euler angles ($\phi$, $\theta$, $\Psi$) characterizing the attitude of the drone and delivering a gyrometric signal ($S_{gyro}$) representative of the instantaneous rotations. Rotation compensation means (136) receive the image signal and the gyrometric signal and deliver retimed image data, compensated for the rotations, then used to estimate the horizontal speeds of the drone. The camera and the inertial unit are piloted by a common clock (160), and it is provided a circuit (170) for determining the value of the phase-shift between the gyrometric signal and the image signal, and to apply this phase-shift value at the input of the rotation compensation means (136) to resynchronize the image signal onto the gyrometric signal before computation of the retimed image data.

3 Claims, 3 Drawing Sheets

DRONE PROVIDED WITH A VERTICAL-VIEW VIDEO CAMERA COMPENSATED FOR THE INSTANTANEOUS ROTATIONS FOR ESTIMATION OF THE HORIZONTAL SPEEDS

The invention relates to the piloting of motorized flying devices such as drones, in particular the rotary-wing drones such as the quadricopters. The AR.Drone 2.0 or the Bebop Drone of Parrot SA, Paris, France, are typical examples of such quadricopters. They are equipped with a series of sensors (accelerometers, 3-axis gyrometers, altimeter), a front camera capturing an image of the scene towards which the drone is directed, and a vertical-view camera capturing an image of the overflown ground. They are provided with multiple rotors driven by respective motors, which can be controlled in a differentiated manner so as to pilot the drone in attitude and speed. Various aspects of such drones are described, among other things, in the EP 2 364 757 A1, EP 2 400 460 A1, EP 2 613 213 A1 or EP 2 644 240 A1, EP 2 613 214 A1 (Parrot SA).

The invention more particularly relates to the measurement of the horizontal speed of the drone, which is essentially based on the use of the image provided by the vertical-view camera, by means of a calculator that analyses the sequence of the images captured by this camera. The estimated displacement of the camera provides a measurement of the horizontal translation of the drone in the two directions, independently of the inertial sensors (accelerometers).

More precisely, two consecutive images given by the camera are analysed to provide an apparent displacement, in pixels, in the one or the other horizontal dimension of an absolute terrestrial reference system. If the altitude is known (given by the ultrasonic and barometric sensors on-board the drone), it is possible to convert this apparent displacement of the images into a distance, hence into a speed, knowing the time interval separating two successive images.

The above-mentioned EP 2 400 460 A1 describes such a technique of measurement of the horizontal speed based on an algorithm of the so-called "optical flow" type, with a possible switching, dynamically controlled, towards another algorithm of the "point detector" or "interest point detection" type when the optical-flow algorithm is no longer able to deliver a reliable-enough result.

The optical-flow method has many advantages, in particular the fact that it imposes very few constraints on the contrast and the content of the scene, and that it is possible to estimate both high speeds and low speeds, by a "multi-resolution" type approach. On the other hand, this method is very sensitive to the rotations and changes of attitude, and it does not permit to intrinsically verify the quality of the delivered result, i.e. the algorithm always delivers a result from the moment that a sufficient number of points shows a high gradient, but this result is delivered even if it has no sense.

De facto, the delivered result is not always reliable, and not very precise, in particular for the low speeds. Now, in order to obtain an efficient and reactive control of automatic stabilization in hovering flight, it is necessary to have a measurement of horizontal speed that is at once accurate, sensitive (because the linear speeds about the point of equilibrium may be very low) and available in real time.

These rotations and changes of attitude liable to have an influence on the measurement of the horizontal speed of the drone may be measured in real time by the inertial unit. The implementation of an optical-flow algorithm moreover comprises, in a manner known per se, a step of compensation for rotations between the successively used images. For that purpose, the errors liable to be introduced (rotations that add a component along the intersection between the image plane and the plane perpendicular to the axis of rotation) are compensated for by adding to the estimated optical flow the displacement of the optical centre due to the rotation between two successive images. In other words, in case of rotation between two successive images of the scene captured by the camera, a new version of the image is generated before being compared with the preceding image, by projection matrix computation performed in real time by the software within the signal processor of the drone. This rotation compensation permits to make the speed computation robust to the rotations met in particular in hovering flight and to keep a linear model of displacement of the drone.

A difficulty in the implementation of this rotation compensation technique lies in the fact that errors on the values of the rotation angles (in particular roll and pitch angles) delivered to the algorithm by the inertial unit produce the same consequences as a translation of the image, and that even minimal errors are liable to generate biases in the estimation of the components of the horizontal speed—even as the rotation compensation algorithm retimes perfectly an image onto the other.

These minimal errors may come in particular from a failure of synchronism between the image signal delivered by the vertical camera and the gyrometric signal delivered by the inertial unit.

If it is desired to avoid any error in the process of rotation compensation, it is hence important to guarantee for each image an extremely accurate synchronisation of these two signals.

The thesis paper of Myung Hwangbo "*Robust Monocular Vision-based Navigation for a Miniature Fixed-Wing Aircraft*", Carnegie-Mellon University, Robotics Institute, 15 Sep. 2009, chapter 4.2.3, heading "Camera-IMU synchronization", describes a simple technique of measurement of the offset between image signal and gyrometric signal. This technique is based on the hypothesis that this time offset remains constant. It consists, at a previous step of calibration, in imparting sinusoidal movements to the drone and in estimating the movement based on the computation of the optical flow on this sinusoidal movement. This movement estimation is then compared to the measurements of the gyrometer, and the retiming of the two sinusoidal-shape signals (image signal and gyrometric signal) gives the searched phase. This measured phase is considered as being constant after the step of calibration, and applied permanently and statically during the subsequent phases of flight.

However, in practice, the errors of synchronisation may result from various factors liable to permanently vary, in particular a certain latency in the software processing of the signals, this latency being not constant and varying in a non-predictable manner as a function, in particular, of the workload of the processor at a given instant.

The above-described simple technique of previous calibration, which is based on the hypothesis that the time offset remains constant, is in no way able to take into account these dynamic phenomena.

The present invention has for object to remedy the above-mentioned drawbacks, by proposing a solution making it possible to guarantee at any time during the drone flight, in real time, an extremely accurate synchronisation between the image signal delivered by the vertical camera and the gyrometric signal delivered by the inertial unit of the drone. And this, in order to avoid any bias introduction into the correction of the rotations between successive images, with the important consequences exposed hereinabove as regards the accuracy of estimation of the drone horizontal speed components.

For that purpose, the invention proposes a drone including, in a manner known per se from the above-mentioned EP 2 400 460 A1:

a vertical-view video camera, adapted to point towards a scene of the ground overflown by the drone, to capture a sequence of images of this scene and to deliver as an output a corresponding digital image signal;

an inertial unit comprising gyrometric sensors adapted to measure the Euler angles characterising the attitude of the drone with respect to an absolute terrestrial reference system and to deliver as an output a gyrometric signal representative of the instantaneous rotations of the drone;

rotation compensation means, receiving as an input i) the image signal delivered by the camera and ii) the gyrometric signal delivered by the inertial unit, and delivering as an output retimed image data, compensated for the rotations of the drone from one image to the following one; and means for estimating the horizontal speeds of the drone based on the displacements from one image to the following one of the scene captured by the camera, these estimation means receiving as an input said retimed image data.

Characteristically of the invention:

the camera and the inertial unit are piloted by a common clock;

the frequency of acquisition of the gyrometric sensors is a multiple of the frequency of delivery of the image signal of the camera; and it is further provided a circuit adapted to:

compare the gyrometric signal delivered by the inertial unit with the image signal delivered by the camera;
determine the value of the phase-shift between these respective signals;
apply this phase-shift value at the input of the rotation compensation means; and
the rotation compensation means are further adapted to perform, before the computation of said retimed image data, a previous correction of resynchronization of the image signal delivered by the camera onto the gyrometric signal delivered by the inertial unit.

Very preferentially, the circuit adapted to compare the gyrometric signal delivered by the inertial unit with the image signal delivered by the camera, to determine the value of the phase-shift between these respective signals, and to apply this phase-shift value at the input of the rotation compensation means, is a hardware-technology circuit.

Preferably, the drone further comprises integrator means, adapted to integrate the gyrometric signal delivered by the inertial unit over the time interval comprised between the delivery of image signals corresponding to two consecutive images of the sequence of images.

An exemplary embodiment of the present invention will now be described, with reference to the appended drawings in which the same references denote identical or functionally similar elements throughout the figures.

Figure 1:
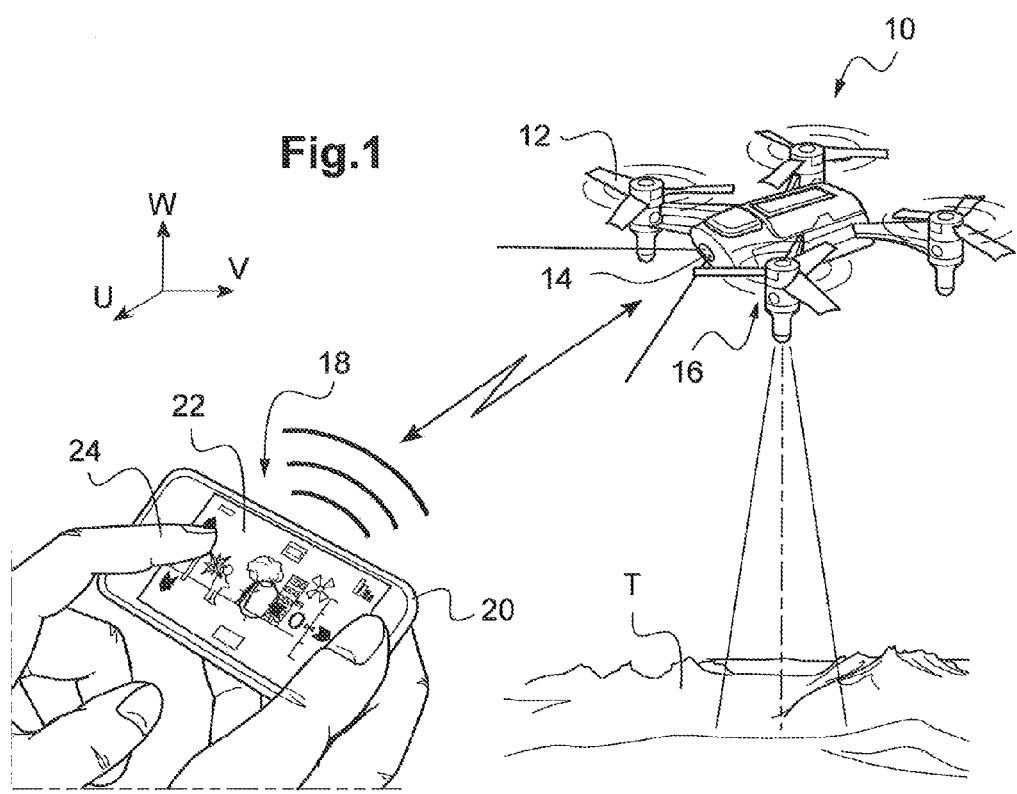
FIG. 1 is a general view showing a drone piloted by a remote-control device.

An exemplary embodiment of the present invention will now be described. In FIG. 1, the reference 10 generally denotes a drone, which is for example a quadricopter such as the Bebop Drone of Parrot SA, Paris, France. This drone includes four coplanar rotors 12 whose motors are piloted independently from each other by an integrated navigation and attitude control system. It is provided with a front-view camera 14 making it possible to obtain an image of the scene towards which the drone is directed, for example a high-definition wide-angle camera with a CMOS sensor of resolution 1920×1080 pixels with a refresh frequency of the video flow of 30 fps (frame per second). The drone is also provided with a vertical-view camera 16 pointing downward, adapted to capture successive images of the overflown ground T and used in particular to evaluate the speed of the drone with respect to the ground. It is for example a camera with a CMOS sensor of QVGA resolution (320×240 pixels), with a refresh frequency of the video flow of 60 fps and a field angle of 64°.

The drone is also provided with inertial sensors (accelerometers and gyrometers) making it possible to measure with a certain accuracy the angular speeds and the attitude angles of the drone, i.e. the Euler angles (pitch $\phi$, roll $\theta$ and yaw $\Psi$) describing the inclination of the drone with respect to a horizontal plane of a fixed terrestrial reference system UVW, it being understood that the two longitudinal and transversal components of the horizontal speed are intimately linked to the inclination according to the two respective pitch and roll axes.

The drone 10 is piloted by a remote remote-control device 18 such as a touch-screen multimedia telephone or tablet having integrated accelerometers, for example a smartphone of the iPhone type (registered trademark) or other, or a tablet of the iPad type (registered trademark) or other. It is a standard device, not modified except the loading of a specific applicative software such as the mobile application AR Free Flight (registered trademark) to control the piloting of the drone 10 and the visualization of the images taken by the on-board front camera 14. The device 18 comprises a body 20 and a touch-screen 22 displaying the image of the scene captured by the front camera 14 with, in superimposition, a certain number of symbols allowing the activation of piloting commands (moving up/down, etc.) by simple contact of a finger 24 of the user on the symbols displayed on the screen. The device 18 is also provided with inclination sensors making it possible to control the attitude of the drone by imparting to the device corresponding inclinations according to the roll and pitch axes to make the drone move forward or rearward. The actions of the user are interpreted by the specific applicative software that transforms them into command signals for the drone.

Figure 2:
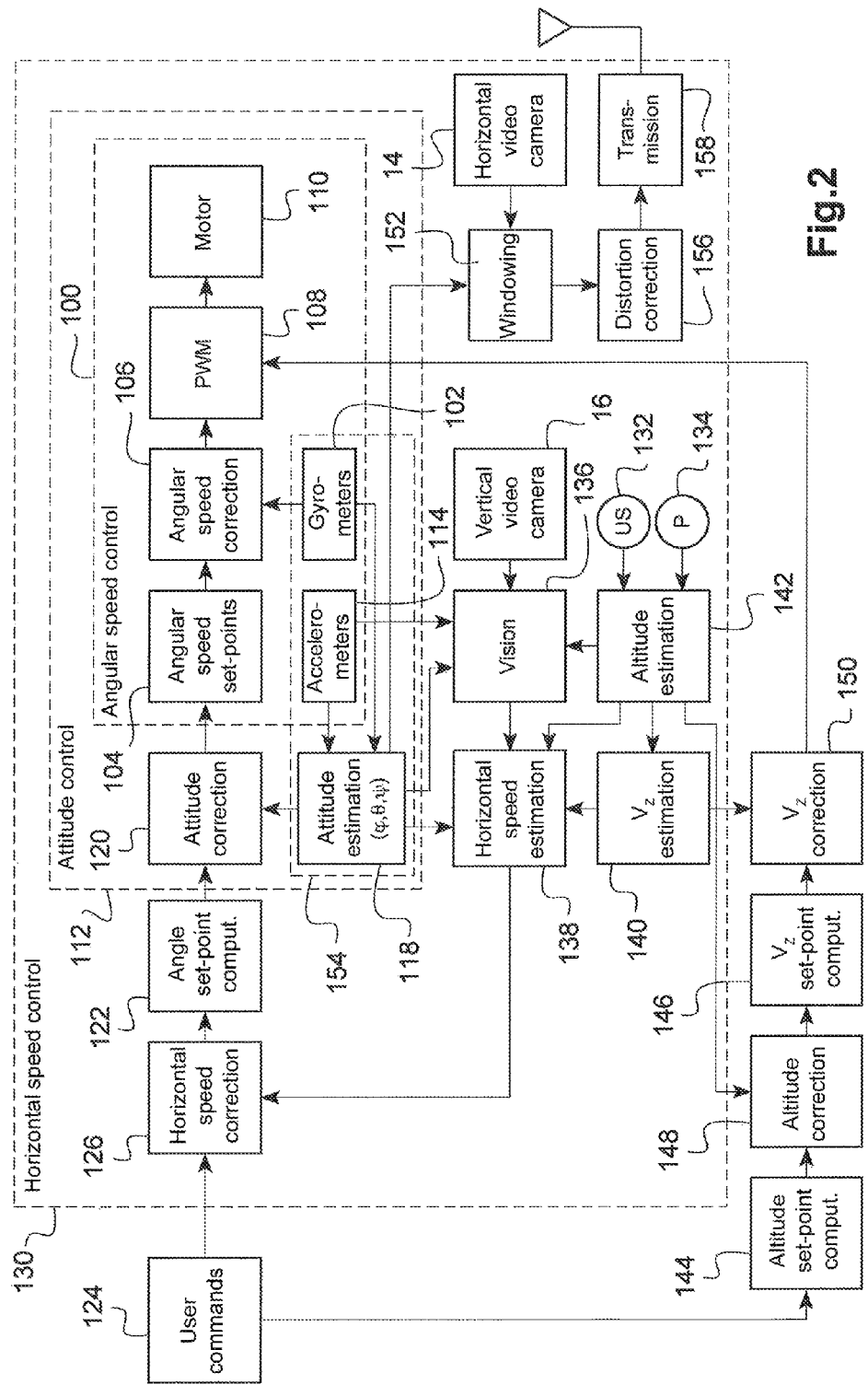
FIG. 2 is a block diagram of the different members for the control, servo-control and piloting of the drone.

FIG. 2 is a block diagram of the various members for the control, servo-control and piloting of the drone, as well as for the correction of the displacements of the image according to the technique of the invention (it will be noted that, although these schemes are presented as interconnected circuits, the implementation of the different functions is essentially software-based, this representation being only illustrative).

Generally, the piloting system involves several interleaved loops for the control of the horizontal speed, of the angular speed, of the drone attitude and of the variations of altitude, automatically or under the control of the user.

The most central loop is the angular speed control loop 100, which uses on the one hand the signals provided by gyrometers 102 and on the other hand a reference consisted of angular speed set points 104. This information is applied at the input of a stage 106 of correction of the angular speed, which itself pilots a stage 108 of control of the motors 110 so as to control separately the regime of the different motors to correct the angular speed of the drone by the combined action of the rotors driven by these motors.

The angular speed control loop 100 is interleaved with an attitude control loop 112, which operates based on the indications provided by the gyrometers 102 and by accelerometers 114. The data coming from these sensors are applied to a stage 118 that produces an estimation of the real attitude of the drone, applied to an attitude correction stage 120. This stage 120 compares the real attitude of the drone with angle set points generated by a circuit 122 based on commands directly applied by the user 124 and/or based on data generated internally by the automatic pilot of the drone via the horizontal speed correction circuit 126. The possibly corrected set points applied to the circuit 120 and compared with the real attitude of the drone are transmitted by the circuit 120 to the circuit 104 to suitably control the motors.

A horizontal speed control loop 130 includes the vertical video camera 16, an ultrasound telemetric sensor 132 and a barometric sensor 134 acting as an altimeter. A circuit 136 ensures the processing of the images produced by the vertical camera 16, in combination with the signals of the accelerometers 114 and of the attitude estimation circuit 118, to produce data making it possible to obtain by means of a circuit 138 an estimation of the horizontal speeds $V_x$ and $V_y$ along the two pitch and roll axes of the drone. The estimated horizontal speeds $V_x$ and $V_y$ are corrected by the estimation of the vertical speed $V_z$ given by a circuit 140 and by an estimation of the value of the altitude z given by the circuit 142 based on the information of the sensors 132 and 134.

For the control of the vertical displacements of the drone, the user 124 applies commands to a circuit 144 for the computation of an altitude set-point, set point that is applied to a circuit 146 for the computation of an ascensional speed set point $V_z$ via the altitude correction circuit 148 receiving the estimated altitude value given by the circuit 142. The so-computed ascensional speed $V_z$ is applied to a circuit 150 that compares it with the corresponding speed estimated by the circuit 140, and modifies accordingly the motor command data (circuit 108) by increasing or reducing the rotational speed simultaneously on all the motors so as to minimize the difference between the ascensional speed set-point and the measured ascensional speed.

As regards the front video camera 14, the latter delivers raw video data (pixel data) to a windowing circuit 152 ensuring the selection of the useful pixels in a capture zone determined by the inertial unit 154 (including the gyrometers 102, the accelerometers 114 and the attitude estimation circuit 118). The video data inscribed in the capture zone are applied to a geometrical distortion correction circuit 156 that produces rectified video data, which are delivered to an emitter circuit 158 ensuring the transmission of the video image to the remote remote-control device held by the user.

Figure 3:
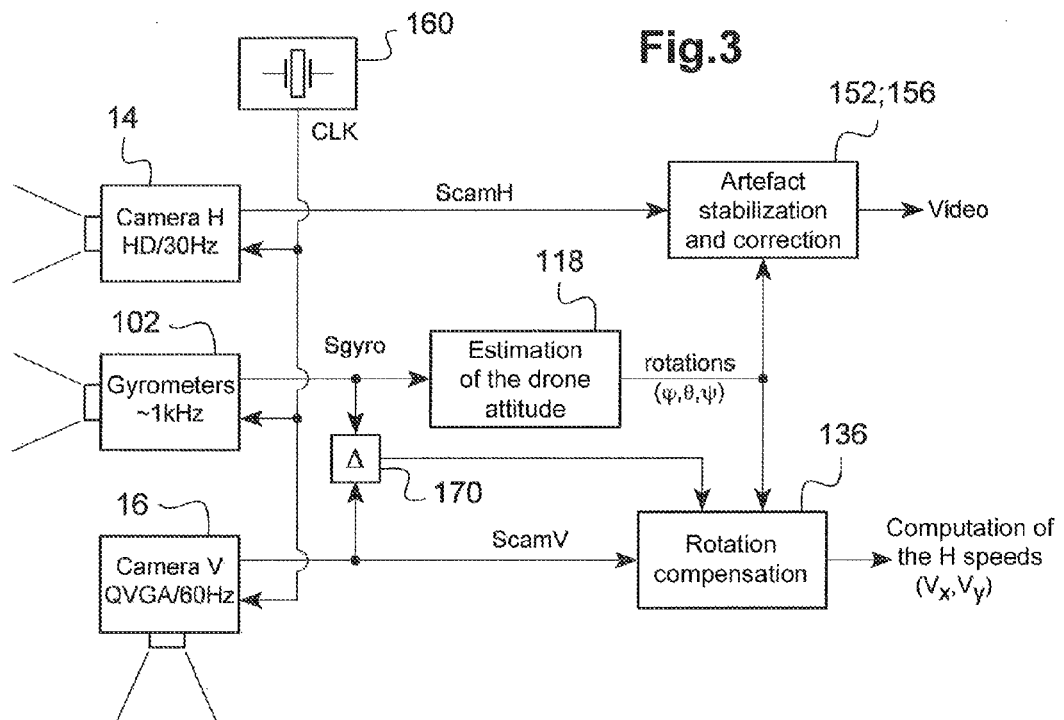
FIG. 3 illustrates, as a block diagram, the different elements contributing to the mechanism of synchronization between the video camera and the gyrometers.

The various aspects relative to the synchronisation of the gyrometric signals and the image signals of the vertical camera, for the computation of the horizontal speeds estimated by the circuit 138, will now be described in more detail, with reference to FIG. 3.

The gyrometers 102, the front camera (horizontal camera) 14 and the vertical-view camera 16 are piloted by a common clock circuit 160, the respective frequencies of operation of the gyrometers and of the cameras 14 and 16 being sub-multiples of the frequency CLK of this clock 160. The gyrometers 102 and the vertical-view camera 16 are hence configured so that:

$$F_{gyro} = K \cdot F_{camV}$$

$F_{gyro}$ being the frequency of acquisition of the gyrometers,
$F_{camV}$ being the frequency of acquisition of the images by the camera 16 (typically $F_{camV}$=60 Hz), and
K being a positive integer.

The fact that K is an integer and that the base clock is the same for the gyrometers and the camera ensures that there will always be K samples of the gyrometric signal $S_{gyro}$ per image of the signal $S_{camV}$, with no drift, the angle measurements always falling at the same instant.

The horizontal camera 14 delivers a signal $S_{camH}$ to the above-mentioned circuits 152 and 156 of windowing and distortion correction, making it possible to stabilize the video image and to correct various artefacts thereof before it is delivered to a user. This image signal $S_{camH}$ comprises an image content signal associated with a synchronization signal $V_{sync\_CamH}$.

The gyrometers 102 deliver a signal $S_{gyro}$ transmitted to the above-mentioned circuit 118 of estimation of the drone attitude, which estimates the rotations $\phi$, $\theta$ and $\Psi$ the drone in the three axes and transmits them to the circuits 152, 156 and 136. This gyrometric signal $S_{gyro}$ comprises a content signal (measurements of the rotations) associated with a synchronisation signal $V_{sync\_Gyro}$.

The vertical camera 16 delivers a signal $S_{camV}$ applied to the above-mentioned circuit 136 that, among other video processing operations, ensures a compensation for rotations from one image to the following one as a function of the rotation estimates delivered, at each image, by the circuit 118, before computation of the horizontal speeds $V_x$ and $V_y$ by application of various algorithms, including in particular an optical-flow algorithm operating by comparison of the apparent displacement between two consecutive images of the ground overflown by the drone. This image signal $S_{camV}$ comprises a image content signal associated with a synchronization signal $V_{sync\_CamV}$.

Figure 4:
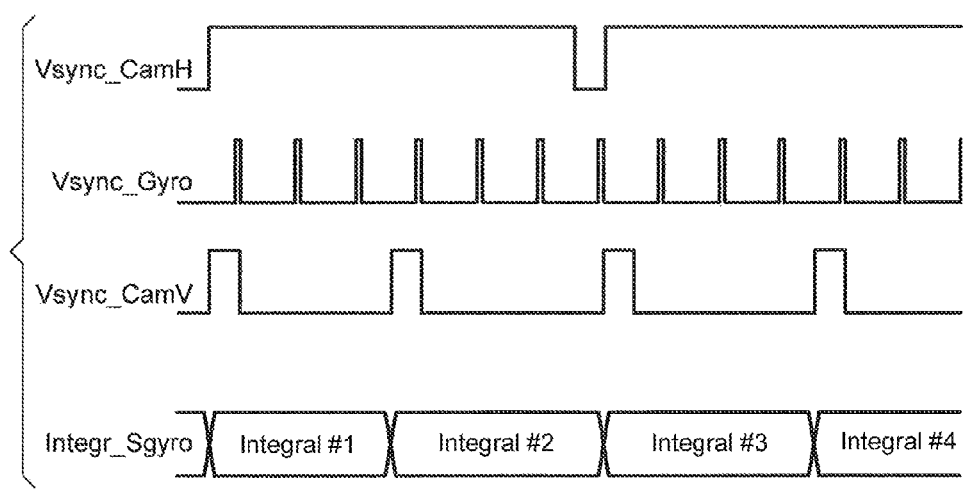
FIG. 4 illustrates various chronograms showing the time relation between the signals delivered by the camera and the gyrometers.

FIG. 4 illustrates a series of chronograms showing in opposition:
the synchronization signal $V_{sync\_CamH}$ of the horizontal camera 14,
the synchronization signal $V_{sync\_Gyro}$ of the gyrometers 102, and
the synchronization signal $V_{sync\_CamV}$ of the vertical camera 6.

The frame rate delivered by the horizontal camera is typically of 30 Hz and that delivered by the vertical camera is of 60 Hz.

As can be seen in these chronograms, the horizontal camera makes a relatively slow acquisition, the acquisition of an image beginning on the rising edge of the signal $V_{sync\_CamH}$ and ending on the falling edge of this same signal. An image of the horizontal camera corresponds that way to an important number of samples of the gyrometers (six samples of the signal $S_{gyro}$ in the simplified example illustrated, in reality typically 30 samples).

As regards the vertical camera, the acquisitions are performed far more rapidly, between the rising edge and the falling edge of the signal $V_{sync\_CamV}$, and the speed estimation algorithm must know in the most accurate way possible the difference of attitude of the drone between two successive images. In the example illustrated, this acquisition corresponds only to a single sample of the gyrometric signal (in reality, typically four samples).

The variation of attitude of the drone between two successive images is advantageously computed with integration of the gyrometric signal $S_{gyro}$ delivered by each of the gyrometers (chronogram Integr_$S_{gyro}$ of FIG. 4). But above all, it is indispensable to have an extremely accurate synchronization between the gyrometric signal $S_{gyro}$ and the image signal $S_{camV}$ delivered by the vertical camera.

In this respect, although the signal $S_{gyro}$ of the gyrometric sensor and the signal $S_{camV}$ of the camera 16 are delivered at the same rate (to within an integer multiple), this gives no guarantee about the phase concordance of these two signals, i.e. their real synchronism.

More precisely, the common clock acts so that the gyrometric signal $S_{gyro}$ does not "slide" with respect to the video signal $S_{camV}$. This means that, when a new image is available, the same time interval always passes by before the gyrometer delivers new data. On the other hand, this time interval varies from one drone to the other, and from one sequence of piloting to the other, because the gyrometric sensors have not been started at the same time as the video camera.

Indeed, the video acquisitions and the gyrometric acquisitions are software-triggered, and it is that way not certain that the two acquisitions start at the same time, and that the time interval separating the two starts is constant from one drone to the other, or from one sequence of piloting to the other for a same drone.

To guarantee a perfect synchronization, the invention characteristically proposes to use a hardware component 170 for the measurement of the phase between the signals $S_{gyro}$ and $S_{camV}$. This component, due to its hardware nature, may measure with a great accuracy and a very great rapidity the time offset A between the signals $V_{sync\_CamV}$ and $V_{sync\_Gyro}$ (FIG. 4). It will be noted that a single measurement is sufficient, because the clocks have been set so as not to drift.

The two just-described mechanisms—common clock 160 and hardware phase-shift measurement circuit 170—provide an extremely accurate measurement of the phase shift between the instant of acquisition of the image beginning and the end of the sampling period of the gyrometer, which makes it possible to connect in time the gyrometric and video signals with a very high accuracy, in real time, to within a clock cycle. The system clock 160 operating at several megahertz, this represents a few nanoseconds of error on the timing between the video and gyrometric signals, which is very small and makes it possible to operate an extremely accurate and efficient correction.

On the other hand, in the absence of this mechanism, it would have been necessary to record by means of a software the instant of delivery of each new data of the gyrometer and each new image acquired. Such a method would be far more accurate and more irregular because sensitive to the time of reaction of the system, and would provide only an accuracy of the order of 100 µs.

The invention claimed is:

1. A drone, comprising:
   a vertical-view video camera, adapted to point towards a scene of the ground (T) overflown by the drone, to capture a sequence of images of this scene and to deliver as an output a corresponding digital image signal ($S_{camV}$);
   an inertial unit comprising gyrometric sensors adapted to measure the Euler angles ($\phi,\theta,\Psi$) characterising the attitude of the drone with respect to an absolute terrestrial reference system (UVW) and to deliver as an output a gyrometric signal ($S_{gyro}$) representative of the instantaneous rotations of the drone;
   rotation compensation means, receiving as an input
   i) the image signal ($S_{camV}$) delivered by the camera and
   ii) the gyrometric signal ($S_{gyro}$) delivered by the inertial unit, and delivering as an output retimed image data, compensated for the rotations of the drone from one image to the following image; and
   means for estimating the horizontal speeds of the drone based on the displacements from one image to the following one of the scene captured by the camera, these estimation means receiving as an input said retimed image data, characterized in that: the camera and the inertial unit are piloted by a common clock;
   the frequency of acquisition of the gyrometric sensors is a multiple of the frequency of delivery of the image signal of the camera; and
   it is further provided a circuit adapted to:
   compare the gyrometric signal ($S_{gyro}$) delivered by the inertial unit with the image signal ($S_{camV}$) delivered by the camera;
   determine the value of the phase-shift between these respective signals;
   apply this phase-shift value at the input of the rotation compensation means; and
   the rotation compensation means are further adapted to perform, before the computation of said retimed image data, a previous correction of resynchronization of the image signal ($S_{camV}$) delivered by the camera onto the gyrometric signal delivered by the inertial unit.

2. The drone of claim 1, wherein said circuit adapted to compare the gyrometric signal delivered by the inertial unit with the image signal delivered by the camera, to determine the value of the phase-shift between these respective signals, and to apply this phase-shift value at the input of the rotation compensation means, is a hardware-technology circuit.

3. The drone of claim 1, further comprising: integrator means, adapted to integrate the gyrometric signal delivered by the inertial unit over the time interval comprised between the delivery of image signals corresponding to two consecutive images of the sequence of images.

* * * * *